(12) United States Patent
Woo et al.

(10) Patent No.: US 9,659,497 B2
(45) Date of Patent: *May 23, 2017

(54) LANE DEPARTURE WARNING SYSTEM AND LANE DEPARTURE WARNING METHOD

(71) Applicant: LG INNOTEK CO., LTD., Seoul (KR)

(72) Inventors: Jeong Woo Woo, Seoul (KR); Ki Dae Kim, Seoul (KR); Babu Manohar, Seoul (KR); Raghubansh B. Gupta, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 254 days.

This patent is subject to a terminal disclaimer.

(21) Appl. No.: 13/932,164

(22) Filed: Jul. 1, 2013

(65) Prior Publication Data

US 2014/0002656 A1 Jan. 2, 2014

(30) Foreign Application Priority Data

Jun. 29, 2012 (KR) .................. 10-2012-0071227

(51) Int. Cl.
*G06K 9/00* (2006.01)
*G08G 1/16* (2006.01)
*G05D 1/00* (2006.01)
*B60R 21/00* (2006.01)
*B60R 1/00* (2006.01)
(Continued)

(52) U.S. Cl.
CPC ......... *G08G 1/167* (2013.01); *G06K 9/00798* (2013.01)

(58) Field of Classification Search
USPC ........................................ 348/148
See application file for complete search history.

(56) References Cited

U.S. PATENT DOCUMENTS 5,208,750 A * 5/1993 Kurami et al. ................. 701/28
5,790,403 A * 8/1998 Nakayama ........... G05D 1/0246
340/435

(Continued)

FOREIGN PATENT DOCUMENTS

KR 10-2012-0009590 A 2/2012

OTHER PUBLICATIONS

Office Action dated Sep. 17, 2013 in Korean Application No. 10-2012-0071227, filed Jun. 29, 2012.

*Primary Examiner* — Jeremaiah C Hallenbeck-Huber
*Assistant Examiner* — Susan E Hodges
(74) *Attorney, Agent, or Firm* — Saliwanchik, Lloyd & Eisenschenk

(57) ABSTRACT

A lane departure warning system includes an image photographing unit attached to a front of a vehicle to photograph an object in a forward direction of the vehicle; a driving unit receiving image data from the image photographing unit, filtering the image data to search for a lane pair, converting an image coordinate of the image data into a real coordinate to calculate a lateral distance between the lane pair and the vehicle and to calculate a lateral speed of the vehicle, and generating a warning generating signal as a time of lane change elapses by obtaining the time of lane change; and a warning unit receiving the warning generating signal to generate a lane departure warning signal.

13 Claims, 10 Drawing Sheets

(51) Int. Cl.
*G06T 7/00* (2006.01)
*H04N 7/00* (2011.01)

(56) References Cited

U.S. PATENT DOCUMENTS

| | | | | |
|---|---|---|---|---|
| 8,144,926 | B2* | 3/2012 | Mori | G06K 9/00798 |
| | | | | 382/103 |
| 8,687,063 | B2* | 4/2014 | Hsieh | B60Q 9/008 |
| | | | | 348/113 |
| 8,825,259 | B1* | 9/2014 | Ferguson | 701/23 |
| 2003/0072471 | A1* | 4/2003 | Otsuka | G05D 1/0246 |
| | | | | 382/103 |
| 2004/0042638 | A1* | 3/2004 | Iwano | 382/104 |
| 2006/0153459 | A1* | 7/2006 | Zhang | G06K 9/3241 |
| | | | | 382/224 |
| 2009/0299573 | A1* | 12/2009 | Thrun et al. | 701/41 |
| 2010/0002911 | A1* | 1/2010 | Wu | G06K 9/00798 |
| | | | | 382/104 |
| 2010/0054538 | A1* | 3/2010 | Boon | 382/104 |
| 2010/0063649 | A1* | 3/2010 | Wu et al. | 701/1 |
| 2010/0289632 | A1* | 11/2010 | Seder et al. | 340/436 |
| 2012/0154588 | A1* | 6/2012 | Kim et al. | 348/148 |
| 2015/0049193 | A1* | 2/2015 | Gupta | G03B 43/00 |
| | | | | 348/148 |

* cited by examiner

Right candidate region group

Left candidate region group

LANE DEPARTURE WARNING SYSTEM AND LANE DEPARTURE WARNING METHOD

CROSS-REFERENCE TO RELATED APPLICATION

This application claims the benefit under 35 U.S.C. §119 of Korean Patent Application No. 10-2012-0071227, filed Jun. 29, 2012, which is hereby incorporated by reference in its entirety.

BACKGROUND

The embodiment relates to a lane departure warning system and a lane departure warning method.

In general, traffic accident inhibiting technologies are mainly focused on vehicle collision inhibiting technologies.

A technology dedicated for a single vehicle predicts collision between vehicles using information sensed from various sensors.

Further, a technology based on cooperation between vehicles senses collision between the vehicles by collecting various information from peripheral vehicles or an infrastructure system using a communication technology such as dedicated short-range communications (DRSC).

However, the traffic accident inhibiting technology according to the related art predicts traffic accident using locations, speed, and direction information of vehicles in cooperation with a vehicle system or receives traffic information from peripheral vehicles or an infrastructure system using a communication technology.

Accordingly, an interworking system is required between a warning system and a vehicle, and data may be polluted due to an erroneous operation of some system.

BRIEF SUMMARY

The embodiment provides a warning system capable of inhibiting accident by warning unexpected lane departure in a single system without cooperation with a vehicle system.

According to the embodiment, there is provided a lane departure warning system including: an image photographing unit attached to a front of a vehicle to photograph an object in a forward direction of the vehicle; a driving unit receiving image data from the image photographing unit, filtering the image data to search for a lane pair, converting an image coordinate of the image data into a real coordinate to calculate a lateral distance between the lane pair and the vehicle and to calculate a lateral speed of the vehicle, and generating a warning generating signal as a time of lane change elapses by obtaining the time of lane change; and a warning unit receiving the warning generating signal to generate a lane departure warning signal.

The driving unit may include: a preprocessing unit filtering the image data to extract candidate lane regions, and grouping the candidate lane regions based on features of the extracted candidate lane regions; a lane searching unit searching for a lane pair from the grouped candidate lane regions from the preprocessing unit; and a warning generating unit obtaining the time of lane change by converting the image coordinate into a real coordinate, and generating a warning generating signal as the time of lane change elapses.

The warning generating unit may select two points from a lane of the image coordinate, and convert the two points into the real coordinate by setting a coordinate of the vehicle as a zero point to obtain two real points.

A running direction of the vehicle and a gradient of the lane may be obtained using the two real points.

The warning generating unit may calculate the lateral distance by discriminating whether the lane is a straight lane or a curved lane.

When the lane is the curved lane, the warning generating unit may select the two points from a lane under an intersection point between the running direction of the vehicle and the lane.

In a case where a running direction of the vehicle is aligned parallel to the straight lane when the curved lane starts after the straight lane is terminated, calculation may be performed by converting the lane into the straight lane.

The warning generating unit may convert the image coordinate into the real coordinate by taking a perspective into consideration.

The lateral speed may be calculated based on variation in a location of the vehicle in a plurality of frames.

The lateral speed may be calculated based on variation in the lateral distance in a plurality of frames.

The lateral distance may be calculated using a tilt angle of a camera of the image photographing unit.

The time of lane change may be a value obtained by dividing the lateral distance by the lateral speed.

According to the embodiment, there is provided a lane departure warning method including: generating image data by photographing an object in a forward direction of a vehicle; filtering the image data to extract candidate lane regions, and grouping the candidate lane regions based on features of the extracted candidate lane regions; searching for a lane pair from the grouped candidate lane regions; and obtaining a time of lane change by converting the image coordinate into a real coordinate; and generating a warning generating signal as the time of lane change elapses.

The obtaining of the time of lane change may include: selecting two points from a lane of the image coordinate; and converting the two points into the real coordinate by setting a coordinate of the vehicle as a zero point to obtain two real points.

The obtaining of the time of lane change may include calculating the lateral distance by discriminating whether the lane is a straight lane or a curved lane.

The lane departure warning method may further include selecting the two points from a lane under an intersection point between the running direction of the vehicle and the lane when the lane is the curved lane.

The lane departure warning method may further include performing calculation by converting the lane pair into a straight line when the lane pair is bent at an angle of 90°.

The obtaining of the time of lane change may include converting the image coordinate into the real coordinate by taking a perspective into consideration.

The lateral speed may be calculated based on variation in a location of the vehicle in a plurality of frames or variation in the lateral distance in a plurality of frames.

The lateral distance may be calculated using a tilt angle of a camera photographing the object in a forward direction of a vehicle.

According to the embodiment, the lane departure can be simply warned by applying lane sensing and tracking functions.

The time of lane change can be acquired by calculating the lateral distance between the vehicle and the lane after converting the image coordinate into the real coordinate, so that the failure can be reduced, thereby improving reliability.

In addition, the calculation can be performed depending on a state of the lane so that the failure can be reduced.

DETAILED DESCRIPTION

Hereinafter, the embodiments will be described with reference to accompanying drawings in detail so that those skilled in the art to which the invention pertains can easily realize the embodiments. However, the embodiments may have various modifications without limitation.

In the following description, when a unit is referred to as it includes a component, the unit may not exclude other components, but further include another component unless the context indicates otherwise.

The embodiment provides a system attached to a vehicle to warn sudden lane departure of a running vehicle.

Hereinafter, a lane departure warning system according to the embodiment will be described with reference to FIGS. 1 and 2.

Figure 1:
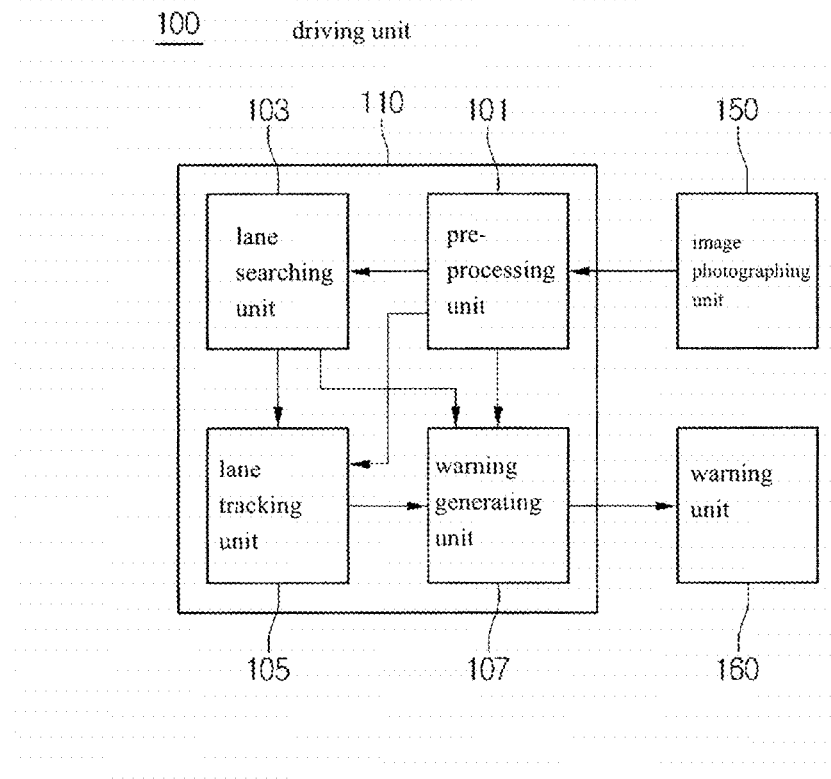
FIG. 1 is a block diagram showing a configuration of a lane departure warning system according to the embodiment.
Figure 2:
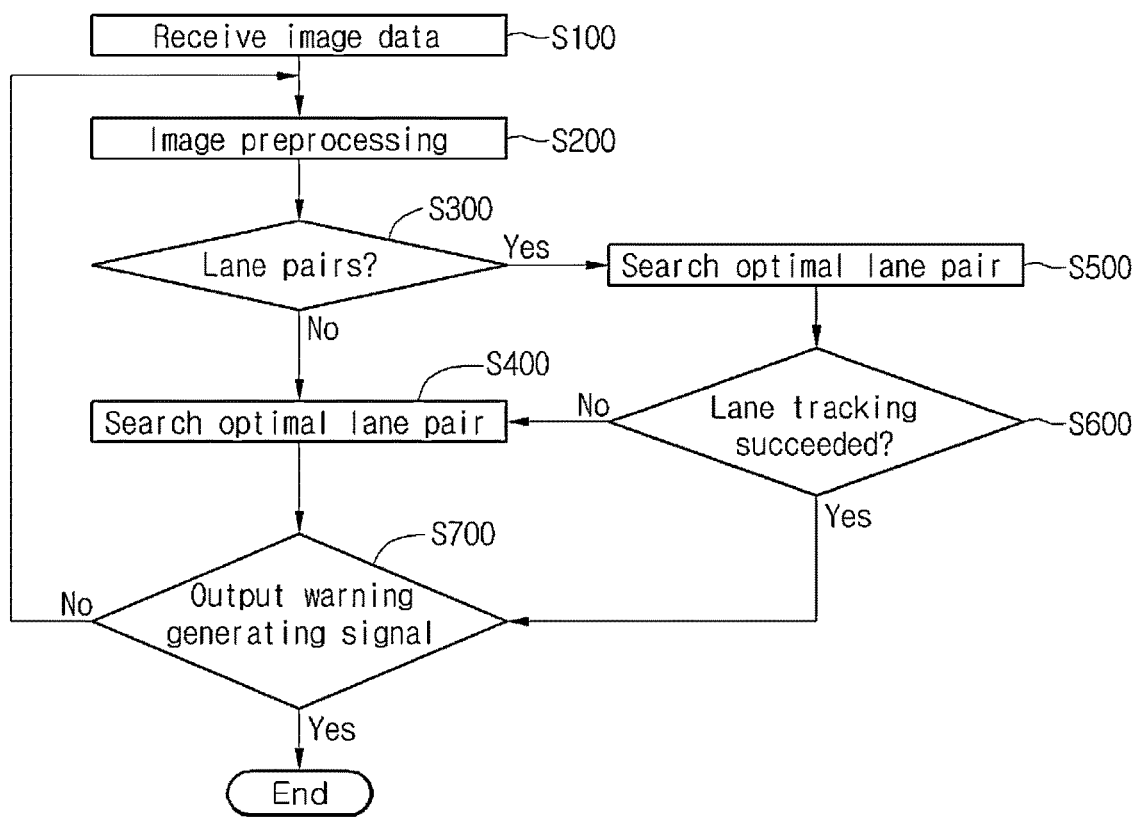
FIG. 2 is a flowchart illustrating an operation of the lane departure warning system shown in FIG. 1.

FIG. 1 is a block diagram showing a configuration of a lane departure warning system according to the embodiment, and FIG. 2 is a flowchart illustrating an operation of the lane departure warning system shown in FIG. 1.

Referring to FIG. 1, the overtaking vehicle warning system includes an image photographing unit 150, a warning unit 160, and a driving unit 110.

The image photographing unit 150 includes a camera photographing a subject at a predetermined frequency, in which the camera photographs a front of a vehicle and transfers a photographed image to the driving unit 110.

In this case, the image photographing unit 150 may include an infrared camera which may operate at night, and may be operated by controlling a lighting system according to external environment.

The warning unit 160 receives a warning generating signal from the driving unit 110 and provides a lane departure warning signal to a driver.

In this case, the overtaking vehicle warning signal may include an audible signal such as alarm. In addition, the overtaking vehicle warning signal may include a visible signal displayed in a navigation device of the vehicle.

The driving unit 110 receives image data photographed from the image photographing unit 150 in a unit of frame (S100), reads a lane from the received image data, calculates a lateral distance between the lane and the vehicle, calculates a time from the lateral distance to the lane departure, and generates a warning generation signal when the calculated time is within a predetermined range.

As shown in FIG. 1, the driving unit 110 may include a preprocessing unit 101, a lane searching unit 103, a lane tracking unit, and a warning generating unit 107.

The preprocessing unit 101 receives image data from the image photographing unit 150 (S100), selects a region of interest (ROI) from the image data to search a lane from the ROI, and groups a plurality of regions determined as one lane (S200).

The lane searching unit 103 searches for lane pairs each including two lines constituting one lane from the grouped regions and searches for an optimal lane pair from the lane pairs (S400).

The lane tracking unit 105 and the lane searching unit 103 are selectively driven. If the lane pairs are searched over several frames from the lane searching unit 130 (S300), the lane tracking unit 105 searches for an optimal lane pair from a reduced ROI based on the searched lane pairs (S500).

In this manner, if the lane tracking of the lane tracking unit 150 is success (S600), the warning generating unit 107 generates a warning generating signal (S700). If the lane tracking unit 150 fails the lane tracking, the lane searching unit 103 again searches for lane pairs.

The warning generating unit 107 receives optimal lane information from the lane searching unit 103 or the lane tracking unit, calculates a lateral distance according to relationship between the lane and the vehicle, and calculates the time of lane change (hereinafter referred to 'TLC') according to the lateral distance between the lane and the vehicle and the lateral speed of the vehicle. If the time of lane change is within a predetermined range, the warning generating unit 107 outputs a warning generating signal.

Hereinafter, the respective steps will be described with reference to FIGS. 3 to 8 in detail.

Figure 3:
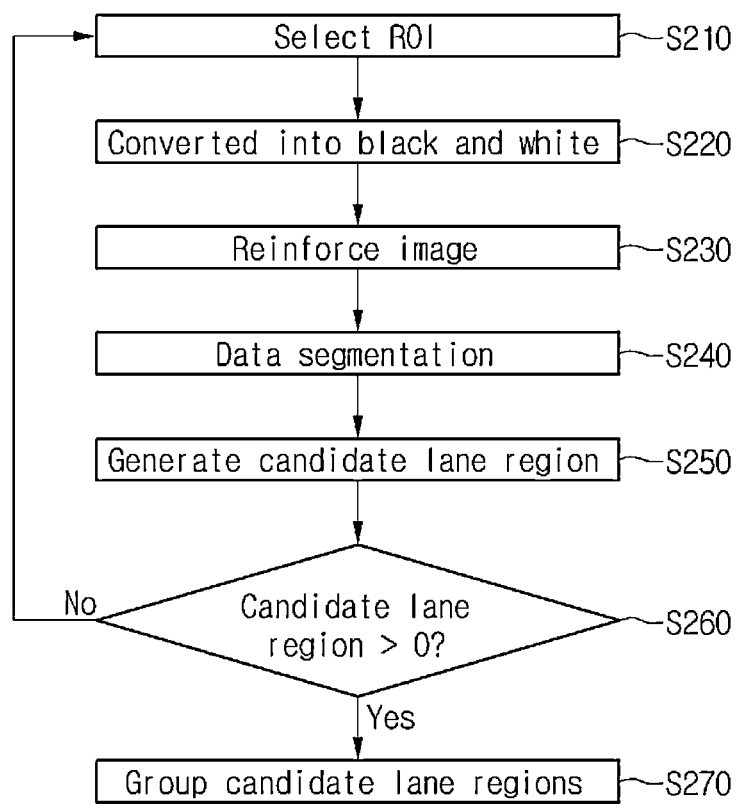
FIG. 3 is a flowchart illustrating an image preprocessing step of FIG. 2 in detail.

First, as shown in FIG. 3, when the image photographing unit 150 photographs an image of an object in a forward direction of the vehicle, the preprocessing unit 101 receives the image of the object to perform the preprocessing.

Figure 4:
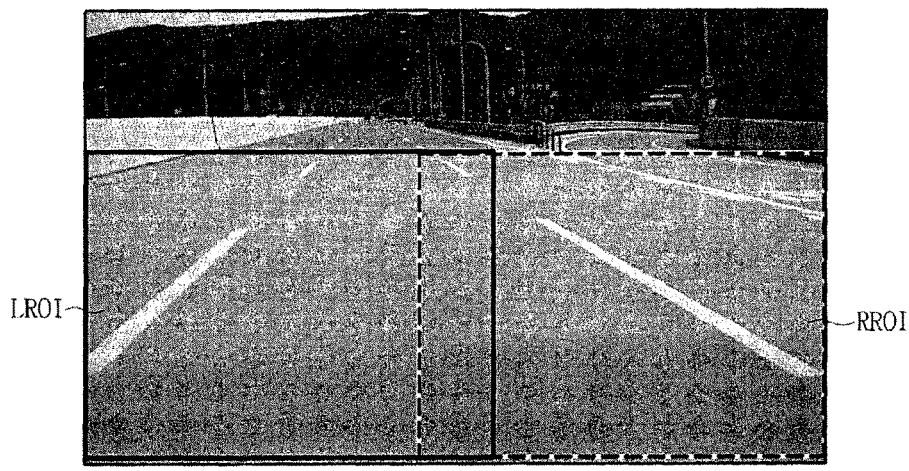
FIG. 4 is a photographic view illustrating an image representing a region of interest (ROI) of FIG. 3.

That is, the ROI is set in the image as shown in FIG. 4, and the set ROI is selected (S210). In this case, the ROI may include a left ROI having a predetermined area ranging from a left peripheral region of the image and a right ROI having a predetermined area ranging from a right peripheral region of the image.

An area of the ROI may be variously set, and the left ROI and the right ROI may be partially overlapped with each other at centers thereof as shown in FIG. 4. In this manner, since the left ROI and the right ROI are partially overlapped with each other, the ROI may include all lanes for the vehicle.

Next, the image of the ROI is converted to have a black and white color (S220). That is, the data size may be reduced by converting RGB data into black and white data (S220).

After that, the preprocessing unit 101 reinforces an image (S230).

In the image reinforcement step, the preprocessing unit 101 increases a contrast ratio by adjusting intensity of illumination. The image reinforcement may be performed by a Constant Limited Adaptive Histogram Equalization (CLAHE) algorithm. Accordingly, a feature of a hidden image may be highlighted.

Subsequently, data segmentation is performed (S240).

The data segmentation is performed by filtering extracting pixels constituting the lane from the reinforced data.

That is, the filtering is performed according to a data application value in each pixel while moving a mask having a predetermined size in the ROI. For example, when an average of data of a plurality of pixels in [(x-mask);x, y] with respect to a point (x, y) is Ileft, and an average of data of a plurality of pixels in [(x+mask);x, y] with respect to a point (x, y) is Iright, a pixel satisfying a following relation equation 1 is selected as a lane pixel.

$$D(x,y) > Ileft + Dth$$

and $$D(x,y) > Iright + Dth \quad \text{[Relation equation 1]}$$

The Dth may be optionally set.

Further, the size of the mask is gradually increased is along a vertical axis of an image so that the perspective may be reflected, but the embodiment is not limited thereto. That is, the size of the mask may flexibly vary.

Next, a candidate lane region is generated by grouping some of the lane pixels (S250).

In this case, the candidate lane region may be generated by grouping the lane pixels according to a size, a boundary point, a main axis, a sub-axis, and a region gradient.

Next, it is determined whether the candidate lane region is generated (S260). When the candidate lane region is generated, a part of the candidate lane regions is grouped (S270).

In this case, the grouping of the candidate lane regions may be performed according to the gradient, but the embodiment is not limited thereto. That is, the candidate lane regions may be grouped by reflecting other features.

That is, a plurality of candidate lane regions constituting one lane are recognized as the one lane and grouped as one candidate lane group. A gradient of the generated group and lower and upper intersection points of the generated group may be stored in a flag as features.

In this case, the image reinforcement step may be omitted or be variously set.

In this manner, if the candidate lane group is formed, the image preprocessing step is terminated.

The following is a description of a lane searching step.

If a lane pair exists in a previous frame after the preprocessing unit 101 terminates grouping the lane regions, a lane tracking step is performed. When no lane pair exists in the previous frame, a lane searching step is performed.

Figure 5:
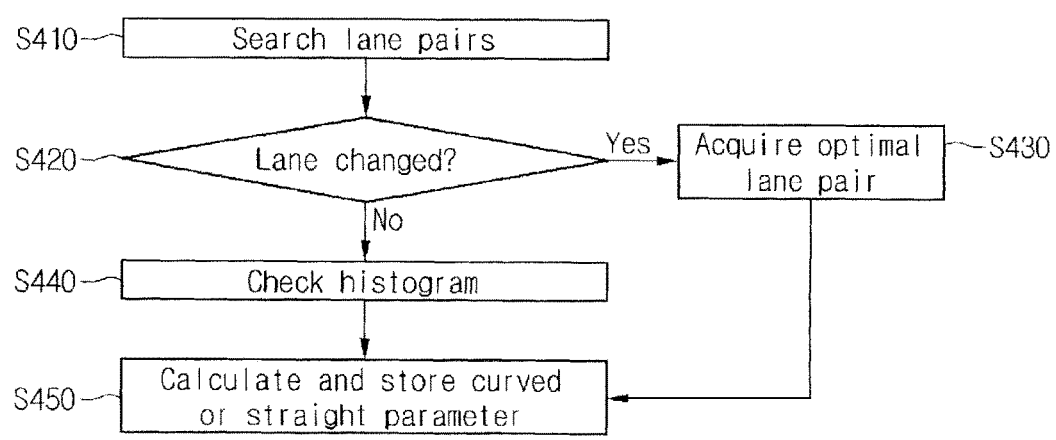
FIG. 5 is a flowchart illustrating a lane searching step of FIG. 2 in detail.

The lane searching step is described with reference to FIG. 5.

First, the lane searching unit 103 searches lane pairs (S410).

The search for the lane pairs is performed by extracting two lanes determined as a pair by comparing features of left and right candidate lane groups with each other.

In this case, when a lane is changed in a previous frame (S420), a currently searched lane pair is determined as an optimal lane pair (S430).

When the lane is not changed, a history of the searched lane pair is checked (S440). In the history check, currently searched lane pairs are compared with previously searched lane pairs, and a lane pair of the currently searched lane pairs matching with the previous lane pairs within a threshold range is determined as an optimal lane pair.

In this case, the compared value may include a gradient and an intersection point, and may selectively include additional features.

If the optimal line pair is determined, a curved or straight parameter is calculated and stored (S450).

The curved or straight parameter may be used in a lane tracking step.

In this manner, if the optimal lane pair in the current frame is determined, the lane searching step is terminated.

Meanwhile, an operation of the lane tracking unit 105 starts after one lane pair is searched from the lane searching unit 103.

Figure 6:
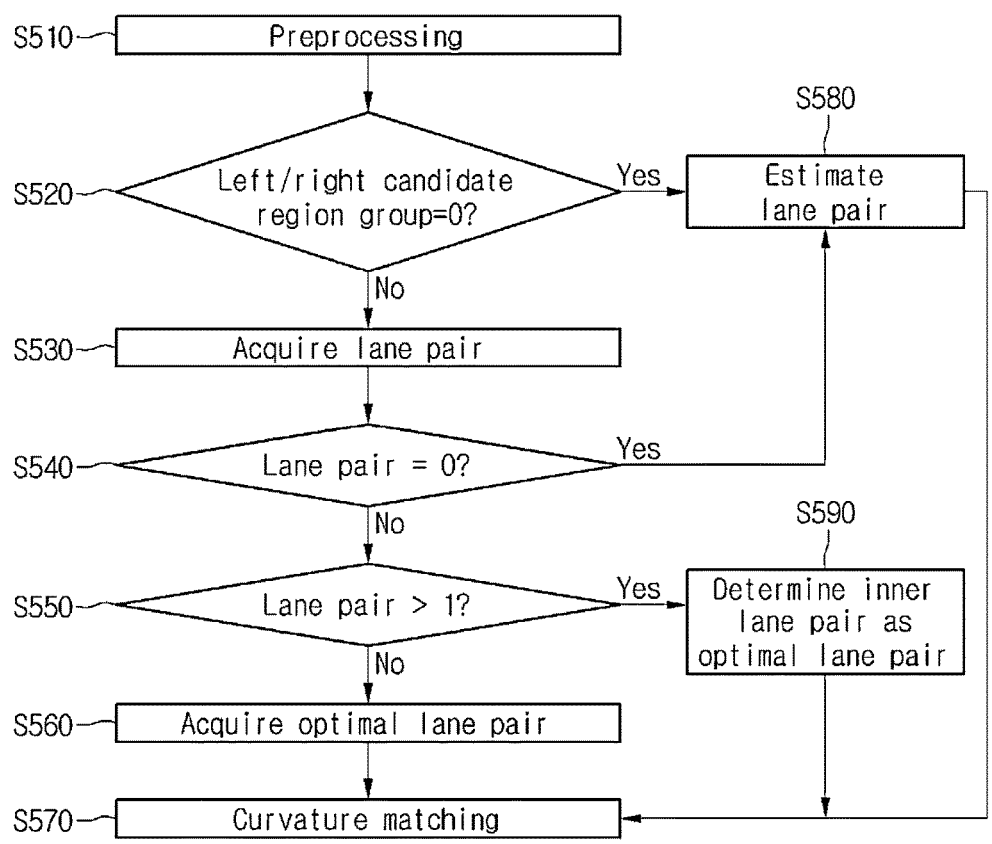
FIG. 6 is a flowchart illustrating a lane tracking step of FIG. 2 in detail.

Referring to FIG. 6, if the lane tracking starts, an ROI region of the preprocessing unit 101 has a reduced shape including surroundings of each searched lane pair without including full images in the horizontal direction as shown in FIG. 4.

The preprocessing operation including black and white conversion, image reinforcement, data division, extraction of candidate lane regions, and grouping of candidate lane regions with respect to the reduced ROI are sequentially performed (S510).

Figure 7:
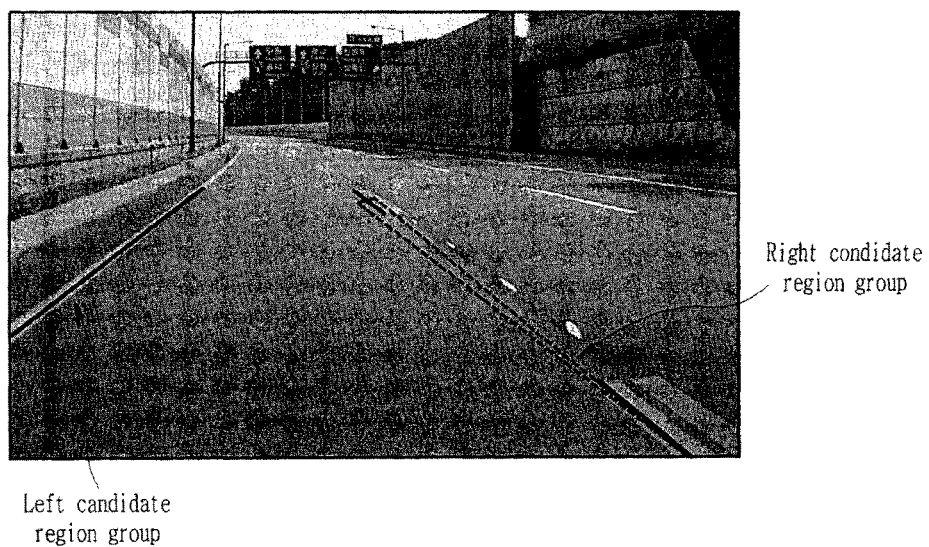
FIG. 7 is a photographic view illustrating an image representing an ROI of the lane tracking step.

Accordingly, the grouped candidate region has a similar gradient within a threshold value as shown in FIG. 7.

Next, when a left candidate region group and a right candidate region group exist (S520), a lane pair is obtained from the candidate region group (S530).

A procedure of obtaining the lane pair is the same as the procedure of obtaining the lane pair in the lane searching procedure.

In this case, the number of the acquired lane pairs is determined (S550). When the number of the acquired lane pairs exceeds 1, an inner lane pair is determined as an optimal lane pair (S590).

In this manner, if the optimal lane pair is determined (S560), curvature matching with respect to the optimal lane pair is performed so that data are stored (S570).

Meanwhile, when both the left candidate region group and the right candidate region group do not exist (S540), the lane pair is estimated (S580).

In the estimation of the line pair, a feature of the estimated lane pair is compared with a feature of a reference lane pair detected in a previous frame to select a lane from an adjacent left or right candidate region group.

In this case, the features of determining the lane may include a gradient and an intersection point. In this manner, the estimated lane pair is determined as an optimal lane pair and the curvature matching with respect to the optimal lane pair is performed so that data are stored.

In this manner, if the optimal lane pair is determined through the lane searching procedure or the lane tracking procedure, a warning generating step is performed.

The warning generating unit 107 determines presence of warning based on vehicle speed and a location of the vehicle from the lane pair.

First, the warning generating unit 107 determines a current location of the vehicle from the line pair to calculate a lateral distance between the lane pair and the vehicle, and to calculate lateral speed of the vehicle (S710).

Hereinafter, an operation of calculating a lateral distance and lateral speed by a warning generating unit 107 is described with reference to FIGS. 9 to 12.

Figure 8:
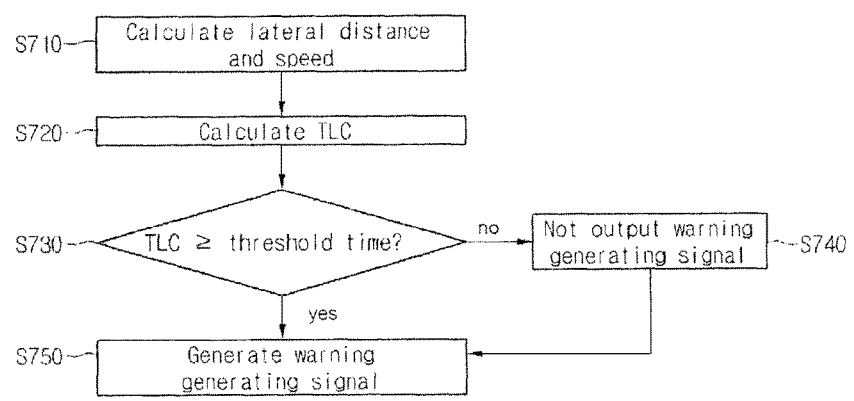
FIG. 8 is a flowchart illustrating a warning generating step in detail.
Figure 9:
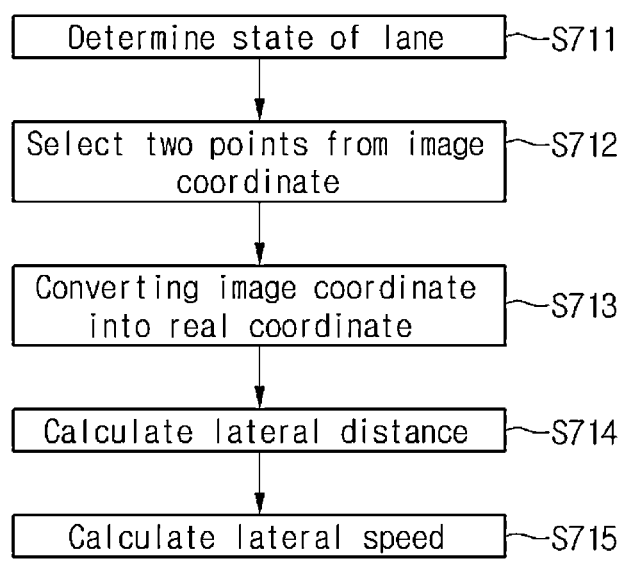
FIG. 9 is a flowchart illustrating a step of determining a lateral distance and lateral speed of FIG. 8 in detail.
Figure 10:
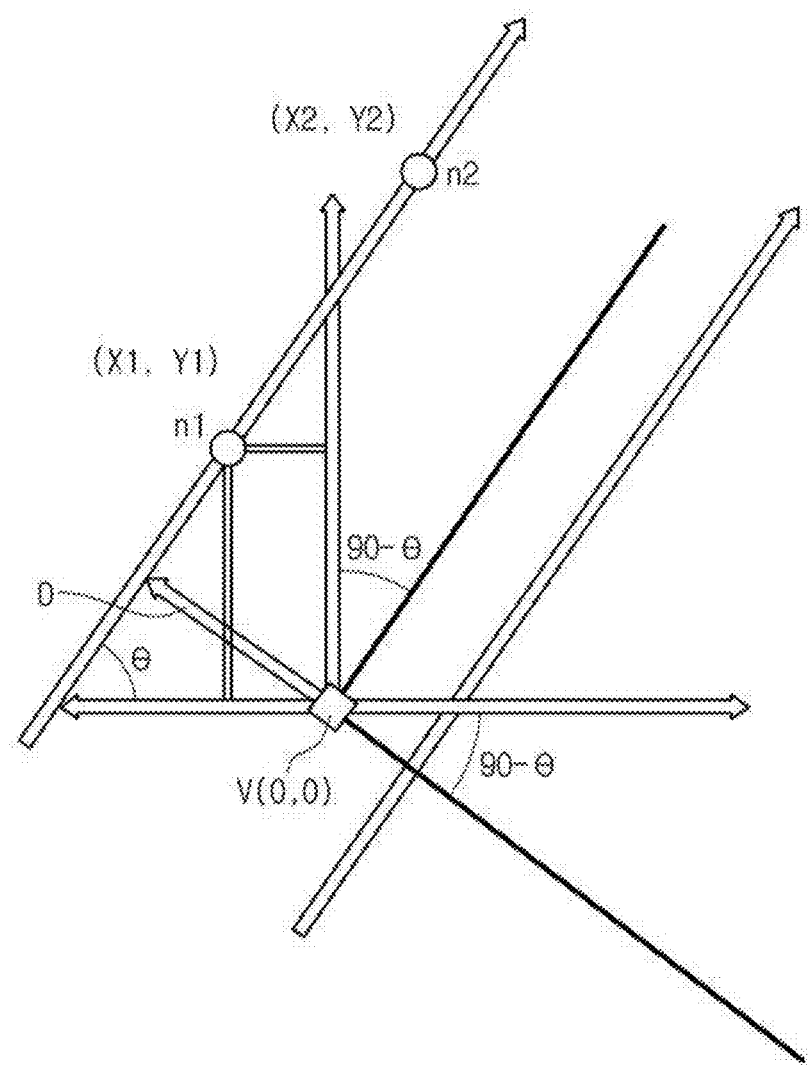
FIG. 10 is a diagram illustrating a real coordinate representing calculation of the lateral distance on a straight lane.

FIG. 9 is a flowchart illustrating a step of determining a lateral distance and lateral speed of FIG. 8, and FIG. 10 is a diagram illustrating real coordinates representing computation of a lateral distance on a straight lane.

First, the warning generating unit 107 detects a state of the lane pair.

That is, the warning generating unit 107 determines a state of the lane by determining whether the lane pair forms a straight line or a curve line (S711).

When the lane pair is the straight lane, the warning generating unit 107 optionally selects two points N1 and N2 on the lane from an image coordinate (S712).

In this case, an x axis coordinate of each of the points N1 and N2 is named as cL, and a y axis coordinate thereof is named as rL.

Next, coordinates of the points N1 and N2 in the image coordinate are represented as real points n1 and n2 in a real coordinate by converting the image coordinate into a real coordinate as illustrated in FIG. 10 (S713).

In this case, a zero point of the coordinate is set based on a location V of the vehicle.

In order to obtain a coordinate of the real point, a tilt angle of the camera is calculated.

The tilt angle is obtained through a following equation 1.

$$\nabla = ac \tan \{1-2(Rh-1)/(m-1)\} \cdot \tan(alphaV) \quad \text{[Equation 1]}$$

In this case, $\nabla$ is defined as a tilt angle, rH is defined as a y coordinate of a vanishing point of an image, and alphaV is defined as half of a vertical tilt angle among view angles of a camera.

A coordinate of a real point of a following equation 2 is obtained using the tilt angle.

$$X(X \text{ coordinate of real point}) = H^*\{\text{rowfactor}^*\tan(alphaV)^*\tan(tilt)\}$$

$$/[\tan(tilt)-\{\text{rowfactor}^*\tan(alphaV)\}]$$

$$Y(Y \text{ coordinate of real point}) = H^*\{\text{colfactor}^*\tan(alphaU)^*\sin(tilt)\}$$

$$/[\sin(tilt)-\{\text{rowfactor}^*\tan(alphaV)^*\cos(tilt)\}] \quad \text{[Equation 2]}$$

In this case, H is defined as a height of the camera and alphaU is defined as half of a horizontal tilt angle among view angles of the camera.

Meanwhile, the rowfactor and the colfactor satisfy a following equation 3.

$$\text{Rowfactor} L = [1-\{(2.*(rL-1))/(m-1)\}]$$

$$\text{Colfactor} L = [1-\{(2.*(cL-1))/(n-1)\}] \quad \text{[Equation 3]}$$

In this case, the m and the n are resolution of the camera.

In this manner, if two point coordinates in the image coordinate are converted into coordinates (X1, Y1, X2 and Y2) of two points in a real coordinate by taking features of the camera into consideration, a real value reflecting the perspective can be calculated.

After that, a lateral distance D between a location of the vehicle and the lane is calculated using a coordinate of a real point (S714).

The lateral distance D satisfies a following equation 4.

$$D=(X1+Y1/\tan \theta)^*\sin \theta \quad \text{[Equation 4]}$$

In this case, $\theta$ is defined as an angle of a vehicle running direction with respect to the lane.

The $\theta$ may be obtained by a following equation 5.

$$\theta = ac \tan \{(Y1-Y2)/(X1-X2)\} \quad \text{[Equation 5]}$$

In this manner, if the lateral distance is obtained, the lateral speed of the vehicle is calculated (S715).

The lateral speed is obtained based on a coordinate of the vehicle in the image coordinate.

In detail, if an X axis coordinate of the vehicle in one frame is XV1 and an X axis of the vehicle in a frame after a time $\Delta t$ elapses is XV2, the lateral speed is expressed as following equation 6.

$$\text{Lateral speed}=(XV2-XV1)/\Delta t \quad \text{[Equation 6]}$$

Next, the warning generating unit 107 calculates a TLC (S720).

The TLC satisfies a following equation 7.

$$TLC=D/\text{lateral speed} \quad \text{[Equation 7]}$$

The TLC is a time taken by a current vehicle to reach a corresponding lane pair, that is, a time taken by the vehicle to depart from a current lane.

Next, a status of the TLC is checked (S730). When the TLC is equal to or greater than a threshold time (S730), the warning generating unit 107 outputs a warning generating signal (S750). To the contrary, if the TLC is less the threshold time, the warning generating unit 107 determines that the lane departure occurs so the warning generating signal is not generated (S740). The threshold time is a time taken to stop the vehicle running in the current speed and may vary according to the current speed.

In this manner, if the driving unit 110 generates the warning generating signal and transmits the warning generating signal to the warning unit 160, the warning unit 160 audibly and visibly provides warning to a driver.

Figure 11:
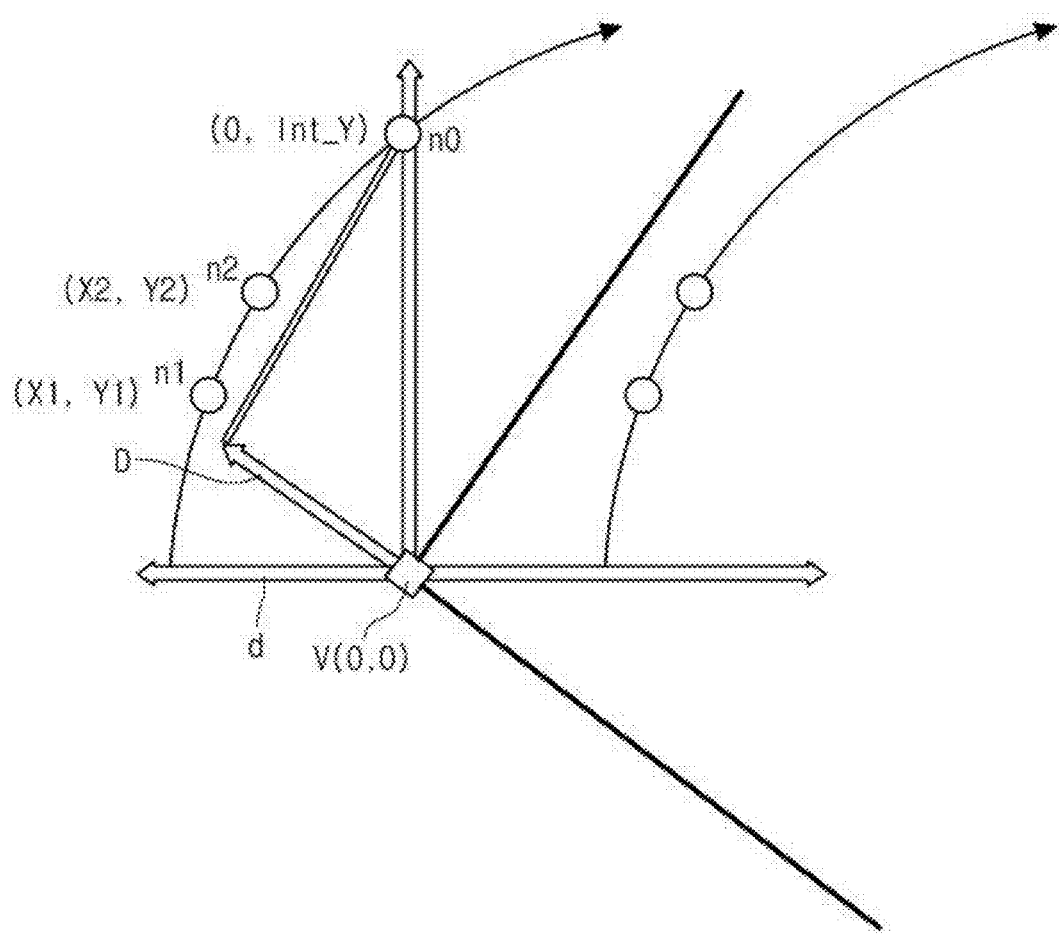
FIG. 11 is a diagram illustrating a real coordinate representing calculation of the lateral distance on a curved lane.
Figure 12:
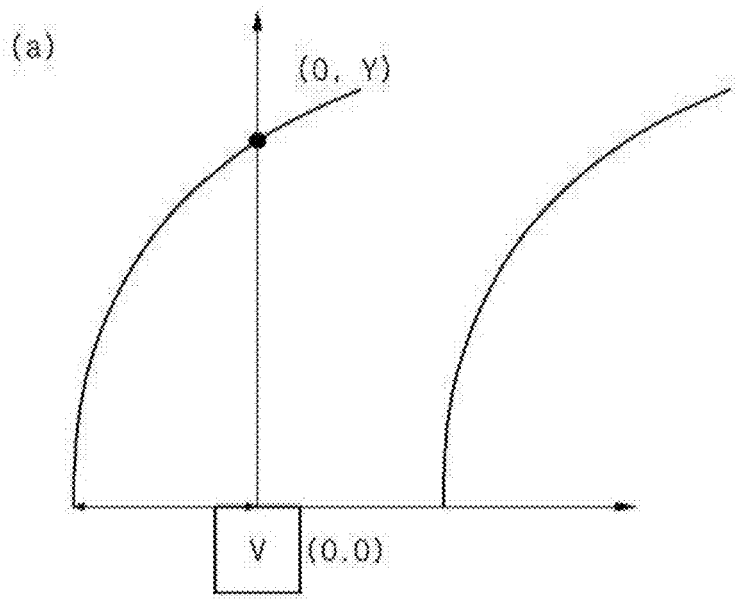
FIGS. 12A and 12B are real coordinates representing calculation of the lateral distance at an inflection point.
Figure 12:
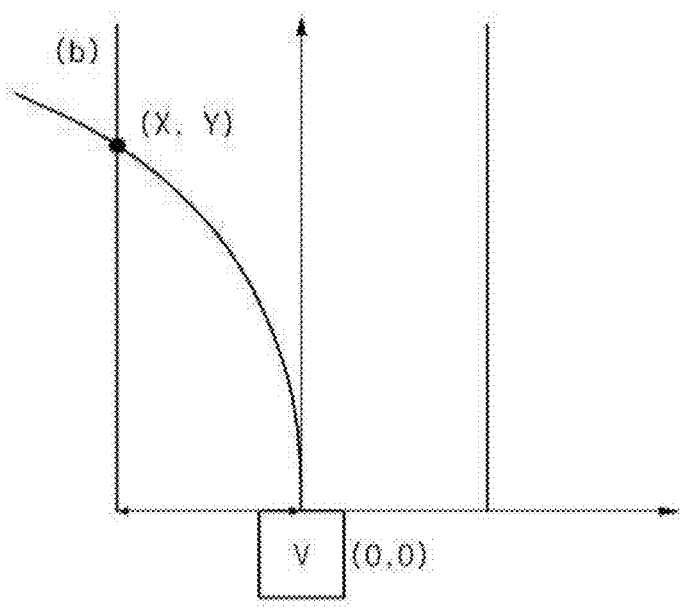

Meanwhile, when the lane pair is a curved lane, the warning generating unit 107 convers the curved lane to calculate the lateral distance as illustrated in FIG. 11.

In a case of the curved lane, an operation of calculating the lateral distance and the lateral speed depends on the equations 1 to 6.

However, in the case of the curved lane, when two points N1 and N2 are selected from the image coordinate, an intersection point between the lane and a Y axis is defined as a start point N0 when a coordinate of the vehicle as a zero point.

Further, the two points N1 and N2 are selected as points under the start point N0 so that a gradient between the curved lane and a running direction of the vehicle is set approximately to a straight lane as possible.

If the two points N1 and N2 are selected so that conversion into the real coordinate is performed, coordinates of the real points n1 and n2, and real start points n0 are calculated, respectively.

In this case, the lateral distance of the curved lane satisfies a following equation 8.

$$D=Int\_Y^*\cos \theta \quad \text{[Equation 8]}$$

In this case, the Int_Y is a Y coordinate of the real start point.

Accordingly, the lateral distance is obtained, and the lateral speed is obtained by the equation 6 so that a TLC of the equation may be calculated.

Meanwhile, upon determining the state of the vehicle, in a case where a running direction of the vehicle is aligned parallel to the straight lane when the curved lane starts after the straight lane is terminated, the lateral distance becomes 0 by the equation 8 so that the error is caused.

In order to inhibit the error, the real coordinate of the curved lane as shown in FIG. 12A is converted into a coordinate of a vehicle entering into the straight lane while being inclined at an angle of 90° as shown in FIG. 12B, and the lateral distance is calculated by applying the equation 4.

Further, when the curved lane is continued over a plurality of frames, the lateral distance of a next frame becomes shorter than a lateral distance of a current frame.

In this case, if a lateral distance of the current frame is D1 and a lateral distance of the next frame is D2, the lateral speed satisfies a following equation 9.

Lateral speed=$(D1-D2)$/frame rate  [Equation 9]

Accordingly, the TLC may be calculated using the lateral speed of the equation 9.

Although a preferred embodiment of the disclosure has been described for illustrative purposes, those skilled in the art will appreciate that various modifications, additions and substitutions are possible, without departing from the scope and spirit of the invention as disclosed in the accompanying claims.

What is claimed is:

1. A lane departure warning system comprising:
an image photographing unit attached to a front of a vehicle to photograph an object in a forward direction of the vehicle;
a driving unit receiving image data from the image photographing unit, filtering the image data to search for lane pairs, converting an image coordinate of the image data into a real coordinate to calculate a lateral distance between the lane pairs and the vehicle and to calculate a lateral speed of the vehicle, and generating a warning generating signal as a time of lane change elapses by obtaining the time of lane change; and
a warning unit receiving the warning generating signal to generate a lane departure warning signal;
wherein the image photographing unit comprises a camera which photographs the object and transfers the image data to the driving unit;
wherein the driving unit comprises;
an image organizer that receives the image data from the image photographing unit, filters the image data to extract candidate lane regions, and groups the candidate lane regions based on features of the extracted candidate lane regions;
a lane searching unit that searches for the lane pairs from the grouped candidate lane regions of the image organizer;
a lane tracking unit that searches for an optimal lane pair from a region of interest (ROI) based on the searched lane pairs, wherein if the optimal line pair is determined, a curved parameter or a straight parameter is calculated and stored; and
a warning generating unit that obtains the time of lane change by converting the image coordinate into the real coordinate, and generates a warning generating signal as the time of lane change elapses;
wherein the warning generating unit selects two points from a lane of the image coordinate, and converts the two points into the real coordinate by setting a coordinate of the vehicle as a zero point to obtain two real points;
wherein the image organizer comprises a preprocessing unit that selects the ROI from the image data to search a lane from the ROI and groups a plurality of regions determined as one lane, filtering being performed according to a data application value of each pixel while moving a mask having a predetermined size in the ROI, and candidate lane regions being generated by grouping a lane pixel according to at least one of a size, a boundary point, a main axis, a sub-axis, or a region gradient;
wherein an image of the ROI is converted to have a black and white color, and the candidate lane regions are recognized as the one lane and grouped as one candidate lane group, and a gradient of the generated group and lower and upper intersection points of the generated group are stored in a flag variable as features;
wherein the lane searching unit searches for lane pairs each including two lines constituting one lane from the grouped regions and searches for an optimal lane pair from the lane pairs, the search for the lane pairs being performed by extracting two lanes determined as a pair by comparing features of left and right candidate lane groups with each other;
wherein in a history check, currently searched lane pairs are compared with previously searched lane pairs, and a lane pair of the currently searched lane pairs matching with the previous lane pairs within a threshold range is determined as an optimal lane pair;
wherein the warning generating unit receives an optimal lane information from the lane searching unit or the lane tracking unit, calculates the lateral distance according to relationship between the lane pairs and the vehicle, and calculates the time of lane change according to the lateral distance between the lane pairs and the vehicle and the lateral speed of the vehicle, and if the time of lane change is within a predetermined range, the warning generating unit outputs the warning generating signal;
wherein the optimal lane pair comprises a left candidate lane, a right candidate lane, and a center candidate lane;
wherein the ROI includes a left ROI having a predetermined area ranging from a left peripheral region of the image on the left candidate lane and the center candidate lane and a right ROI having a predetermined area ranging from a right peripheral region of the image on the right candidate lane and the center candidate lane;
wherein central portions of the left ROI and the right ROI are partially overlapped;
wherein a running direction of the vehicle and a gradient of the lane are obtained using the two real points;
wherein the warning generating unit calculates the lateral distance between the lane pairs and the vehicle by determining whether any one of the lane pairs is a straight lane pair or a curved lane pair;
wherein, when the determined lane pair is the curved lane pair, the warning generating unit selects the two points from a lane under an intersection point between the running direction of the vehicle and the determined lane pair; and
wherein, when a running direction of the vehicle is aligned parallel to the straight lane pair while the curved lane pair starts after the straight lane pair is terminated, the calculation of the lateral distance between the lane pairs and the vehicle is performed by converting the lane pair into the straight lane pair.

2. The lane departure warning system of claim 1, wherein the warning generating unit converts the image coordinate into the real coordinate by taking a perspective into consideration.

3. The lane departure warning system of claim 1, wherein the lateral speed of the vehicle is calculated based on variations of a location of the vehicle in a plurality of frames.

4. The lane departure warning system of claim 1, wherein the lateral speed of the vehicle is calculated based on variations of the lateral distance between the lane pair and the vehicle in a plurality of frames.

5. The lane departure warning system of claim 1, wherein the lateral distance between the lane pairs and the vehicle is calculated with a tilt angle of a camera of the image photographing unit.

6. The lane departure warning system of claim 1, wherein the time of lane change is a value obtained by dividing the lateral distance between the lane pairs and the vehicle by the lateral speed of the vehicle.

7. A lane departure warning method comprising:
generating image data by photographing an object in a forward direction of a vehicle with an image photographing unit attached to a front of the vehicle to photograph the object;
filtering the image data to extract candidate lane regions, and grouping the candidate lane regions based on features of the extracted candidate lane regions;
searching for lane pairs from the grouped candidate lane regions;
obtaining a time of lane change by converting an image coordinate into a real coordinate; and
generating a warning generating signal as the time of lane change elapses,
wherein a driving unit filters the image data, then searches for the lane pairs, then obtains the time of lane change, and then generates a warning generating signal;
wherein the driving unit comprises:
an image organizer that receives the image data from the image photographing unit, filters the image data to extract candidate lane regions, and groups the candidate lane regions based on features of the extracted candidate lane regions;
a lane searching unit that searches for the lane pairs from the grouped candidate lane regions from the image organizer;
a lane tracking unit that searches for an optimal lane pair from a region of interest (ROI) based on the searched lane pairs, wherein if the optimal line pair is determined, a curved parameter or straight parameter is calculated and stored; and
a warning generating unit that obtains the time of lane change by converting the image coordinate into the real coordinate, and generates a warning generating signal as the time of lane change elapses;
wherein the image photographing unit comprises a camera that photographs the object and transfers the image data to the driving unit;
wherein the image organizer comprises a preprocessing unit that selects the ROI from the image data to search a lane from the ROI and groups a plurality of regions determined as one lane, filtering being performed according to a data application value of each pixel while moving a mask having a predetermined size in the ROI, and candidate lane regions being generated by grouping a lane pixel according to at least one of a size, a boundary point, a main axis, a sub-axis, or a region gradient;
wherein an image of the ROI is converted to have a black and white color, and the candidate lane regions are recognized as the one lane and grouped as one candidate lane group, and a gradient of the generated group and lower and upper intersection points of the generated group are stored in a flag variable as features;
wherein the lane searching unit searches for lane pairs each including two lines constituting one lane from the grouped regions and searches for an optimal lane pair from the lane pairs, the search for the lane pairs being performed by extracting two lanes determined as a pair by comparing features of left and right candidate lane groups with each other;
wherein in a history check, currently searched lane pairs are compared with previously search lane pairs, and a lane pair of the currently searched lane pairs matching with the previous lane pairs within a threshold range is determined as an optimal lane pair;
wherein the warning generating unit receives an optimal lane information from the lane searching unit or the lane tracking unit, calculates a lateral distance according to relationship between the lane pairs and the vehicle, and calculates the time of lane change according to the lateral distance between the lane pairs and the vehicle and a lateral speed of the vehicle, and if the time of lane change is within a predetermined range, the warning generating unit outputs the warning generating signal;
wherein the optimal lane pair comprises a left candidate lane, a right candidate lane, and a center candidate lane;
wherein the ROI includes a left ROI having a predetermined area ranging from a left peripheral region of the image on the left candidate lane and the center candidate lane and a right ROI having a predetermined area ranging from a right peripheral region of the image on the right candidate lane and the center candidate lane;
wherein central portions of the left ROI and the right ROI are partially overlapped;
wherein the obtaining of the time of lane change comprises;
selecting two points from a lane of the image coordinate;
converting the two points into the real coordinate by setting a coordinate of the vehicle as a zero point to obtain two real points; and
calculating the lateral distance between the lane pairs and the vehicle by determining whether any one of the lane pairs is a straight lane pair or a curved lane pair;
wherein, when the determined lane pair is the curved lane pair, the warning generating unit selects the two points from a lane under an intersection point between the running direction of the vehicle and the determined lane pair; and
wherein, when a running direction of the vehicle is aligned parallel to the straight lane pair while the curved lane pair starts after the straight lane pair is terminated, the calculating the lateral distance between the lane pairs and the vehicle is performed by converting the lane pair into the straight lane pair.

8. The lane departure warning method of claim 7, further comprising performing a calculation by converting the determined lane pair into a straight line when the determined lane pair is bent at an angle of 90°.

9. The lane departure warning method of claim 7, wherein the obtaining of the time of lane change comprises converting the image coordinate into the real coordinate by taking a perspective into consideration.

10. The lane departure warning method of claim 7, wherein the lateral speed of the vehicle is calculated based on variations of a location of the vehicle in a plurality of frames or variations of the lateral distance between the lane pairs and the vehicle in a plurality of frames.

11. The lane departure warning system of claim 1, wherein the lane tracking unit and the lane searching unit are selectively driven.

12. The lane departure warning system of claim 1, when the lane searching unit searches the lane pairs, if a lane is changed in a previous frame, a currently searched lane pair is determined as the optimal lane pair, and if the lane is not changed, a history of the currently searched lane pair is checked.

13. The lane departure warning system of claim 1, wherein the overlapped central portions of the left ROI and the right ROI are disposed on the center candidate lane.

* * * * *